(12) United States Patent
Hsieh

(10) Patent No.: US 9,983,423 B2
(45) Date of Patent: May 29, 2018

(54) TOUCH SENSITIVE DISPLAY WITH GRADED INDEX LAYER

(71) Applicant: Apple Inc., Cupertino, CA (US)

(72) Inventor: Wen-I Hsieh, Hsin Chu (TW)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 15/148,833

(22) Filed: May 6, 2016

(65) Prior Publication Data
US 2017/0083123 A1 Mar. 23, 2017

Related U.S. Application Data

(60) Provisional application No. 62/221,901, filed on Sep. 22, 2015.

(51) Int. Cl.
*G02F 1/133* (2006.01)
(52) U.S. Cl.
CPC .................................. *G02F 1/133* (2013.01)
(58) Field of Classification Search
CPC ....... G02F 1/133; G02F 1/13; H01L 51/5275; H01L 51/56; H01L 51/5253; H01L 27/3244; H01L 2227/323
See application file for complete search history.

(56) References Cited

U.S. PATENT DOCUMENTS

| | | | |
|---|---|---|---|
| 3,706,485 A * | 12/1972 | Fawcett | .............. C03C 17/3417 359/588 |
| 5,504,389 A | 4/1996 | Dickey | |
| 2007/0222922 A1 | 9/2007 | Jin et al. | |
| 2012/0026591 A1 | 2/2012 | Hayashibe et al. | |
| 2014/0049822 A1 | 2/2014 | Gollier et al. | |
| 2014/0334006 A1 | 11/2014 | Adib et al. | |
| 2015/0077646 A1 | 3/2015 | Chen et al. | |
| 2016/0190519 A1* | 6/2016 | Cho | ..................... H01L 51/5275 257/98 |

* cited by examiner

*Primary Examiner* — Lun-Yi Lao
*Assistant Examiner* — Jarurat Suteerawongsa
(74) *Attorney, Agent, or Firm* — Treyz Law Group, P.C.; Jason Tsai

(57) ABSTRACT

An electronic device may include multiple display layers. The display layers may include a matching layer implemented using multiple graded index of refraction sublayers to help minimize reflections. The matching layer may include a first sublayer having a monotonically increasing index of refraction, a second (reverse matching) sublayer having a monotonically decreasing index of refraction, and a third sublayer having a monotonically increasing index of refraction. The second reverse matching sublayer may serve to induce an optical path difference that results in destructive inference at one or more specific wavelengths. The thickness of the reverse matching sublayer may be tuned to center the destructive interference at the desired wavelength(s). If desired, multiple matching layers each having their own reverse matching layers may be stacked on top of one another to provide reflectance suppression at multiple wavelengths.

20 Claims, 10 Drawing Sheets

TOUCH SENSITIVE DISPLAY WITH GRADED INDEX LAYER

This application claims the benefit of provisional patent application No. 62/221,901, filed Sep. 22, 2015, which is hereby incorporated by reference herein in its entirety.

BACKGROUND

This relates generally to electronic devices and, more particularly, to electronic devices with touch screen displays.

Electronic devices often include displays. For example, cellular telephones and portable computers often include displays for presenting information to a user.

Some conventional displays include a silicon nitride layer that is formed on a glass substrate layer. The index of refraction of silicon nitride is relatively high compared to that of the glass substrate material. For example, silicon nitride may have a refractive index of 1.9, whereas the glass substrate may have a refractive index of 1.5. As a result, there is a significant index-of-refraction mismatch between the silicon nitride layer and the substrate. If care is not taken, the index-of-refraction mismatch may give rise to increased reflection from the display.

It would therefore be desirable to be able to provide improved touch screen displays for electronic devices.

SUMMARY

An electronic device that includes display circuitry is provided. In accordance with an embodiment, the display circuitry may include a first display layer having a first index of refraction that is substantially fixed, a second display layer having a second index of refraction that is substantially fixed, wherein the second index of refraction is different from the first index of refraction, and a matching layer interposed between the first and second display layers. In particular, the matching layer may include a first portion having a graded index of refraction that monotonically increases from the first display layer to the second display layer and a second portion having a graded index of refraction that monotonically decreases from the first display layer to the second display layer. The second portion of the matching layer has a thickness that determines what wavelength additional reflection suppression is provided.

In some arrangements, the matching layer may further include a third portion having a graded index of refraction that monotonically increases from the first display layer to the second display layer. The second portion of the matching layer may be interposed between the first and third portions of the matching layer.

Incoming light may traverse the first display layer before traversing the second display layer. The first index of refraction may be less than the second index of refraction. The first portion of the matching layer may have a first surface with an index of refraction that matches with the first index of refraction of the first display layer. The first portion of the matching layer may have a second surface with another index of refraction. The second portion of the matching layer may have a surface with an index of refraction that matches the another index of refraction.

In accordance with another embodiment, an apparatus is provided that includes a first layer having a first index of refraction that is substantially fixed, a second layer having a second index of refraction that is substantially fixed, and a graded index of refraction matching layer interposed between the first and second layers, where the graded index of refraction matching layer includes an embedded reverse matching sublayer.

In particular, the embedded reverse matching sublayer has an index of refraction that monotonically decreases in a given orientation. The graded index of refraction matching layer may include another sublayer having an index of refraction that monotonically increases in the given orientation (i.e., one sublayer has refractive indices that increase while the other sublayer has refractive indices that decrease).

The apparatus may also include an additional graded index of refraction matching layer that is interposed between the first and second layers, where the additional graded index of refraction matching layer also includes an embedded reverse matching sublayer. The embedded reverse matching sublayer in the graded index of refraction matching layer may have a first thickness, and the embedded reverse matching sublayer in the additional graded index of refraction matching layer may have a second thickness that is different than the first thickness. Configured in this way, the two matching layers serve to provide enhanced reflection suppression in at least two separate wavelengths.

Further features of the invention, its nature and various advantages will be more apparent from the accompanying drawings and following detailed description.

DETAILED DESCRIPTION

Electronic devices may include displays. The displays may be used to display images to a user. Illustrative electronic devices that may be provided with displays are shown in FIGS. 1, 2, 3, and 4.

Figure 1:
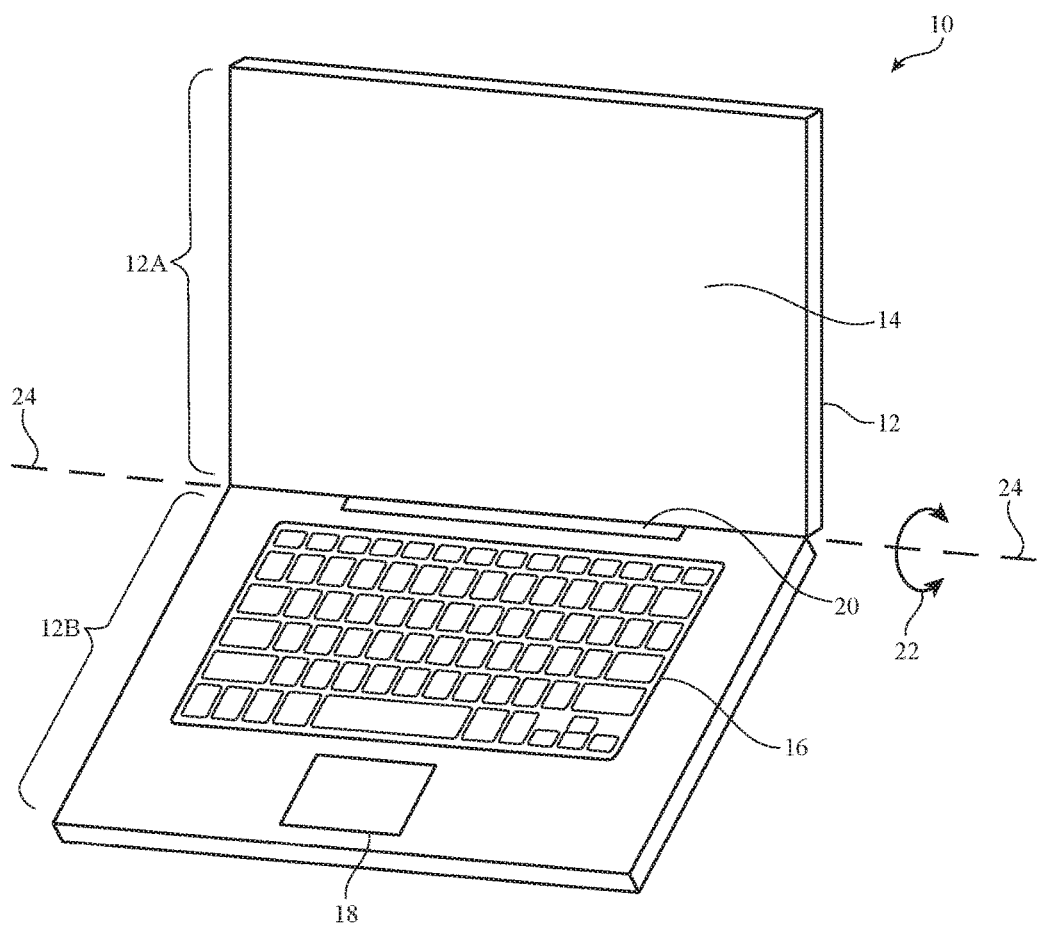
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
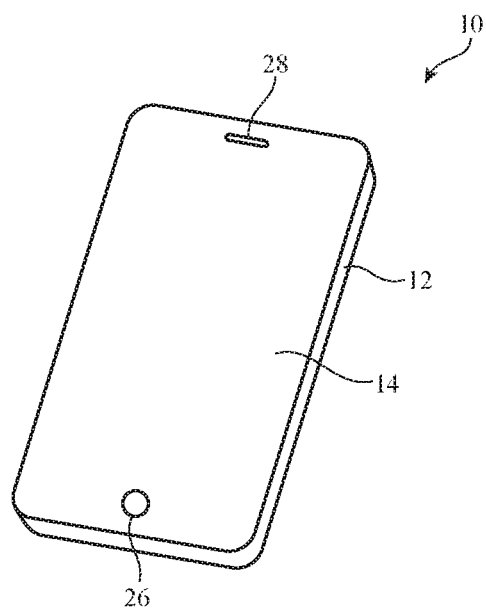
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, watch, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2). In compact devices such as wrist-watch devices, port 28 and/or button 26 may be omitted and device 10 may be provided with a strap or lanyard.

Figure 3:
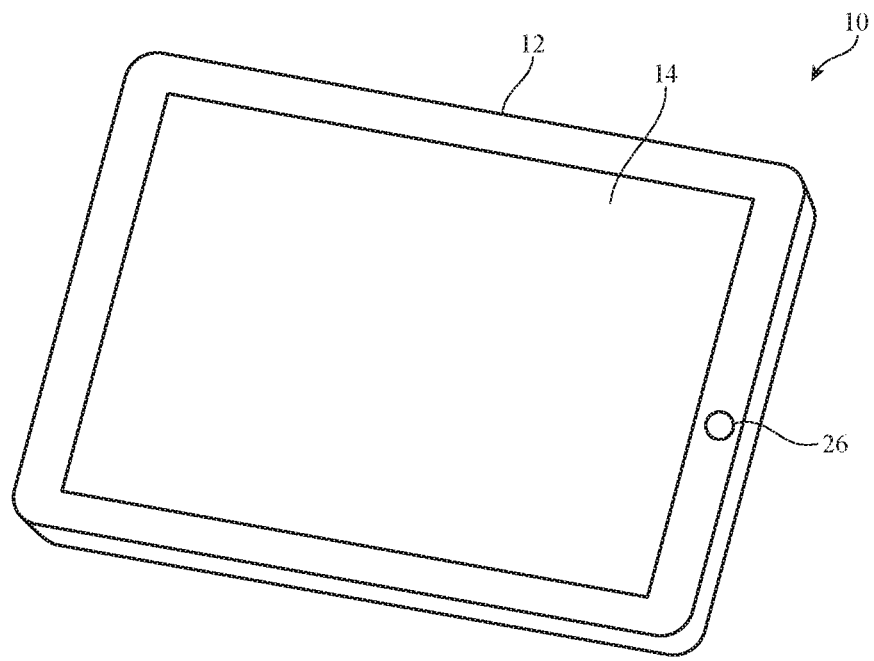
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
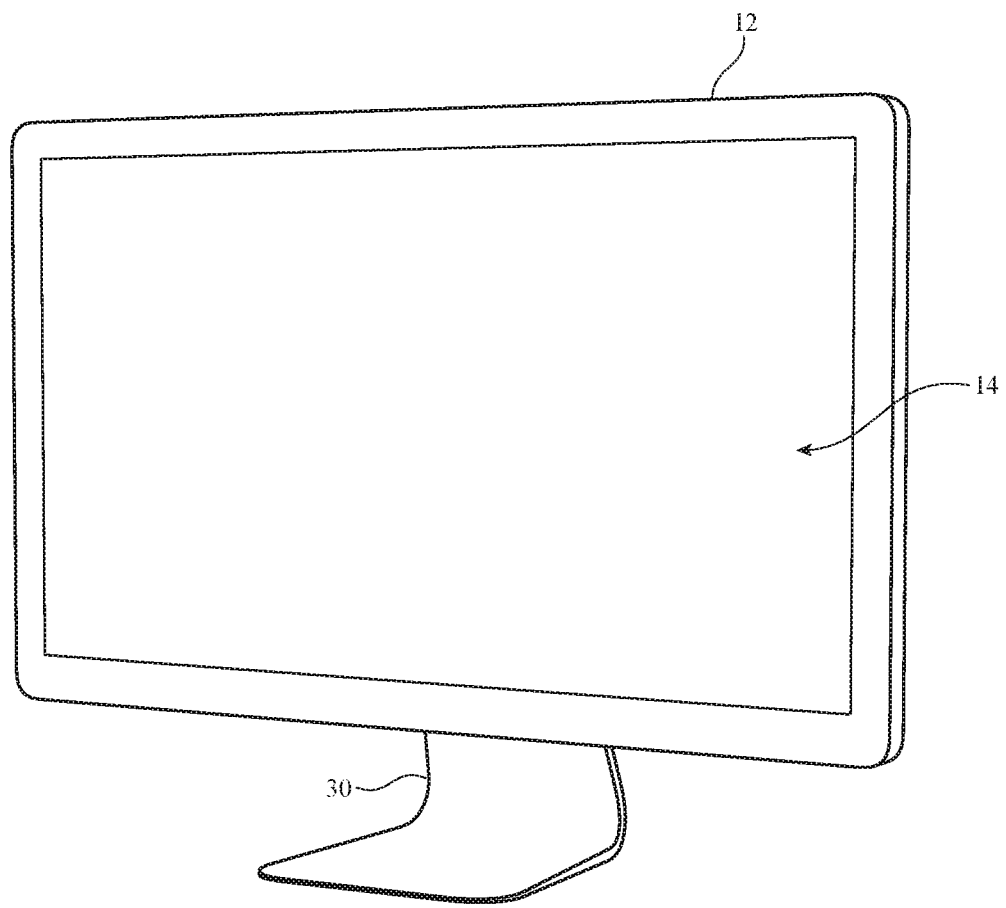
FIG. 4 is a perspective view of an illustrative electronic device such as a computer or other device with display structures in accordance with an embodiment.

FIG. 4 shows how electronic device 10 may be a display such as a computer monitor, a computer that has been integrated into a computer display, or other device with a built-in display. With this type of arrangement, housing 12 for device 10 may be mounted on a support structure such as stand 30 or stand 30 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components. A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
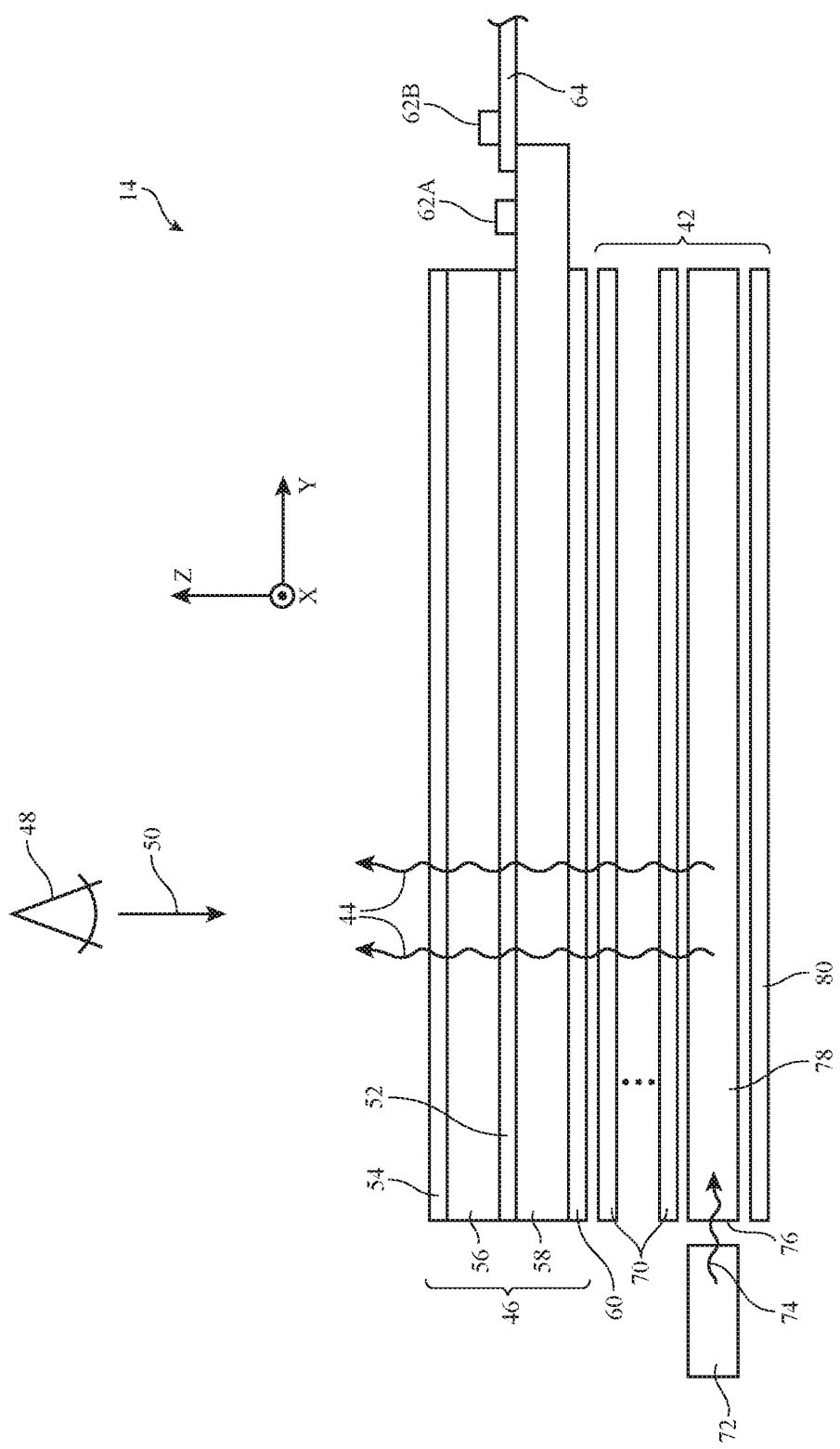
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78. Light source 72 may be located at the left of light guide plate 78 as shown in FIG. 5 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of plastic covered with a dielectric mirror thin-film coating.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, films such as compensation films may be incorporated into other layers of display 14 (e.g., polarizer layers).

The example of FIG. 5 in which display 14 is a liquid crystal display is merely illustrative and does not serve to limit the scope of the present invention. In other suitable embodiments, display 14 may be an organic light-emitting diode display, a plasma display, an electrophoretic display, an electrowetting display, a display using other types of display technology, or a display that includes display structures formed using more than one of these display technologies.

Figure 6:
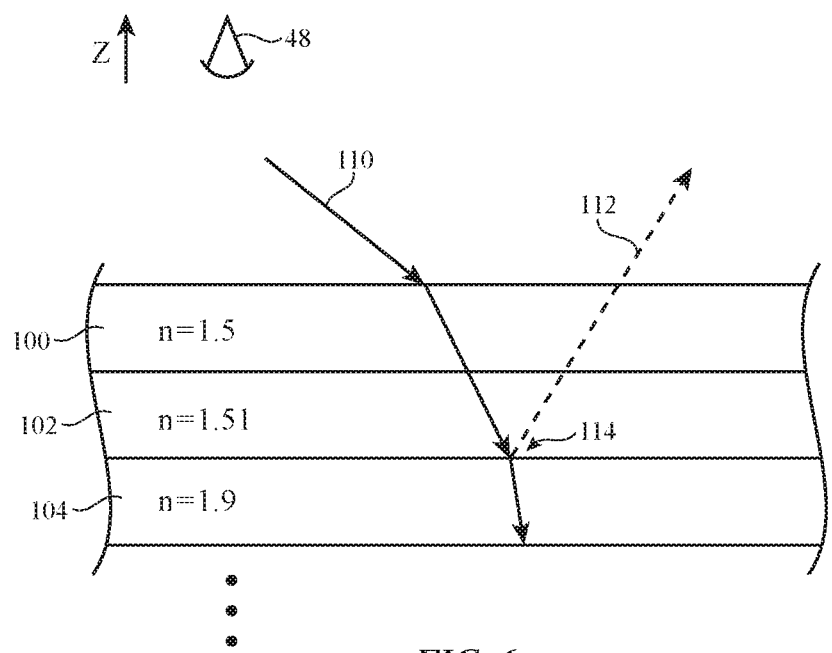
FIG. 6 is a cross-sectional side view of a conventional display stack-up.

Regardless of the type of display technology on which an electronic device display is based, the display typically includes multiple layers formed from different materials. FIG. 6 is a cross-sectional side view of a conventional display stack-up. As shown in FIG. 6, the display includes a first outermost cover layer 100, a second layer 102 on which first layer 100 is formed, and a third layer 104 on which second layer 102 is formed. Other display layers can be formed beneath layer 104.

In the configuration of FIG. 6, layer 100 is a transparent glass substrate having a refractive index of 1.5; layer 102 is a silicon-based spin-on glass (SOG) layer having a refractive index of 1.51; and layer 104 is a silicon nitride layer having a refractive index of 1.9. Due to the index-of-refraction mismatch between SOG layer 102 and silicon nitride layer 104, there is a potential for undesired reflections and visible artifacts. In the example of FIG. 6, incoming light ray 110 entering the display layers can potentially be reflected back towards user 48 (see, light 112 being reflected at interface 114 between layers 102 and 104), which can cause glare and specular reflections at the surface of the display and thereby reduces the visibility of the content that is being displayed.

To minimize such types of undesired reflections due to index-of-refraction mismatch, the material surrounding the high index of refraction material can be configured to have a graded index of refraction. The presence of the graded index in the vicinity of the high index of refraction material such as a silicon nitride layer helps to reduce index mismatch at the interface between the silicon nitride layer and adjoining layers that are formed from lower index of refraction materials. Such types of layers with a graded refractive index are sometimes referred to as a "matching layer."

Figure 7:
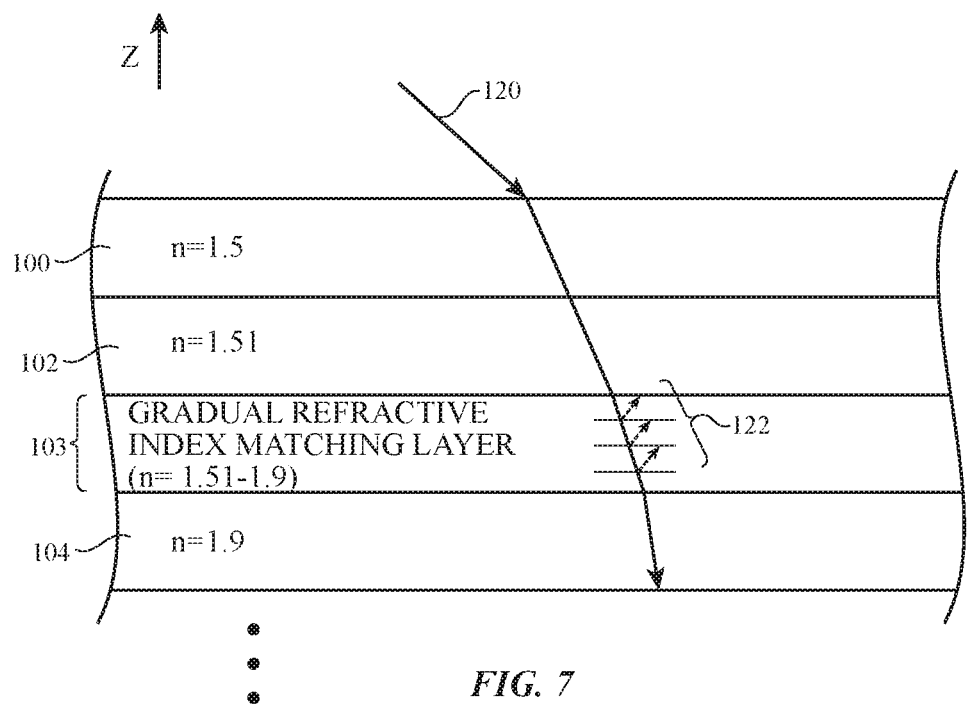
FIG. 7 is a cross-sectional side view of illustrative display layers including a gradual refractive index matching layer in accordance with an embodiment.

FIG. 7 shows a cross-section of a display that includes a gradual refractive index matching layer 103 that is interposed between low index of refraction layer 102 and high index of refraction layer 104. The graded index of refraction may be produced by using a continuously or stepwise varying mixture of high and low index materials. As an example, the graded index of refraction may be produced by depositing a continuously varying (or stepwise varying) mixture of silicon oxide ($SiO_2$) and niobium oxide ($Nb_2O_5$). The deposited mixture may have an index of refraction of close to that of glass by adjusting the mixture to include mostly silicon oxide (n=1.51). Near the interface between the deposited mixture and the silicon nitride layer 104, more niobium oxide may be incorporated into the mixture to raise the index of refraction to match that of silicon nitride (n=1.9). Configured in this way, incoming light ray 120 entering the display layers and traversing through matching layer 103 may exhibit reduced reflections 122 relative to that observed in FIG. 6.

Figure 8:
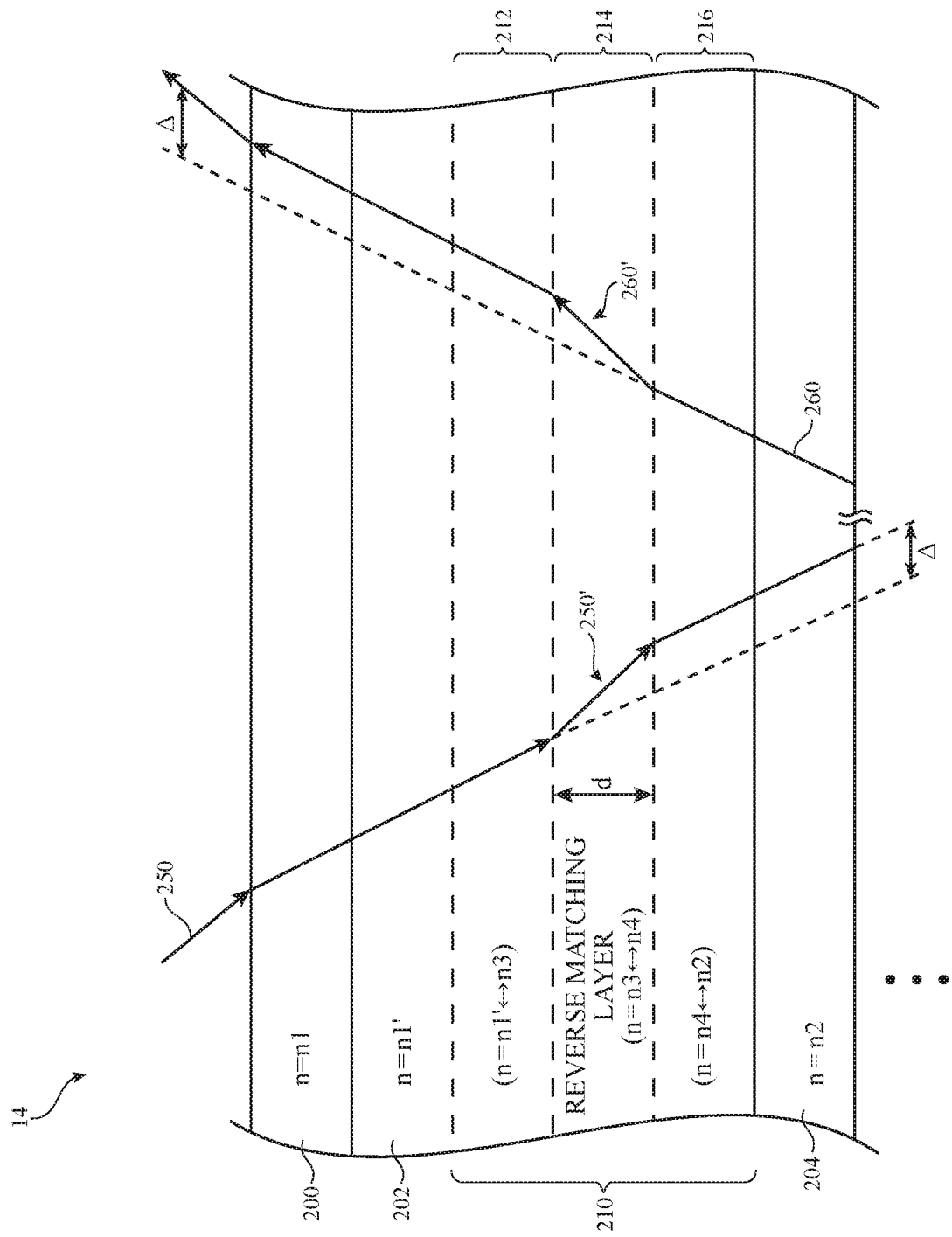
FIG. 8 is a cross-sectional side view of illustrative display layers including a reverse matching layer in accordance with an embodiment.

In accordance with an embodiment, FIG. 8 shows a cross-sectional side view of display 14 with illustrative display layers that may include a matching layer having an embedded reverse matching layer that can help provide improved reflection suppression. As shown in FIG. 8, display 14 may include a first outer layer such as layer 200, a second layer such as layer 202 that is formed under layer 200, a third layer under such as layer 204 that is formed under layer 202, and a matching layer such as graded refractive index matching layer 210 that is interposed between layers 202 and 204. Layer 200 may, for example, be a transparent substrate layer, a cover glass layer, or any suitable protective layer that serves as an external cover for the face of display 14. Layer 202 may be an underlying layer such as a silicon-based spin-on-glass (SOG) layer that has a substantially similar index of refraction as layer 200. As an example, layer 200 may have a refractive index n1 of 1.5, whereas layer 202 may have a refractive index n1' of 1.51.

Layer 204 may be a passivation layer (e.g., a silicon nitride passivation layer), a touch sensor electrode layer (e.g., an indium tin oxide layer with embedded electrodes for a touch sensor display), or other suitable types of layers having an index of refraction n2 that is substantially different than that of layer 202. As an example, layer 204 may have a refractive index n2 that is equal to 1.9. In general, layers 202 and 204 may represent any two adjacent layers with substantially mismatching indices of refraction within an electronic display. Two layers may be considered to have substantially different/mismatched indices of refraction when their indices of refraction differ by at least 10%, at least 20%, at least 30%, etc.

As described above, matching layer 210 may be interposed between layers 202 and 204 to minimize reflections at the interface between the two layers. In particular, matching layer 210 may have a first matching sublayer 212, a second matching sublayer 214, and a third matching sublayer 216. Sublayer 212 may be a graded index layer having an index of refraction of n1' at its top surface to match with that of adjoining display layer 202 and an index of refraction of n3 at its bottom surface (in the orientation of FIG. 8), where n3 is greater than n1' (i.e., the refractive index increases with depth).

Sublayer 214 may be a graded index layer having an index of refraction of n3 at its top surface and an index of refraction of n4 at its bottom surface, where n4 is actually less than n3. Sublayer 214 having refractive indices that decreases with depth is sometimes referred to herein as a "reverse" matching sublayer.

Sublayer 216 may be a graded index layer having an index of refraction of n4 at its top surface and an index of refraction of n2 at its bottom surface to match with that of adjoining display layer 204, where n2 is greater than n4. Formed in this way, matching layer 210 has a refractive index profile that helps minimize reflections at the interface between the upper surface of sublayer 212 and layer 202 and at the interface between the bottom surface of sublayer 216 and layer 204.

Sublayers 212, 214, and 216 may be formed from transparent dielectric material such as a mixture of silicon oxide and dielectric that has a higher index of refraction than silicon oxide. Silicon oxide has an index of refraction of 1.5. Dielectric materials that have an index of refraction higher than silicon oxide include niobium oxide, tantalum oxide, titanium oxide, other metal oxides, oxynitrides, silicon nitride, etc. In other words, an increasing amount of silicon oxide (relative to the amount of niobium oxide, for example) may be used in the mixture to gradually lower the index of refraction, whereas a decreasing amount of silicon oxide may be used in the mixture to gradually increase the index of refraction.

Figure 9:
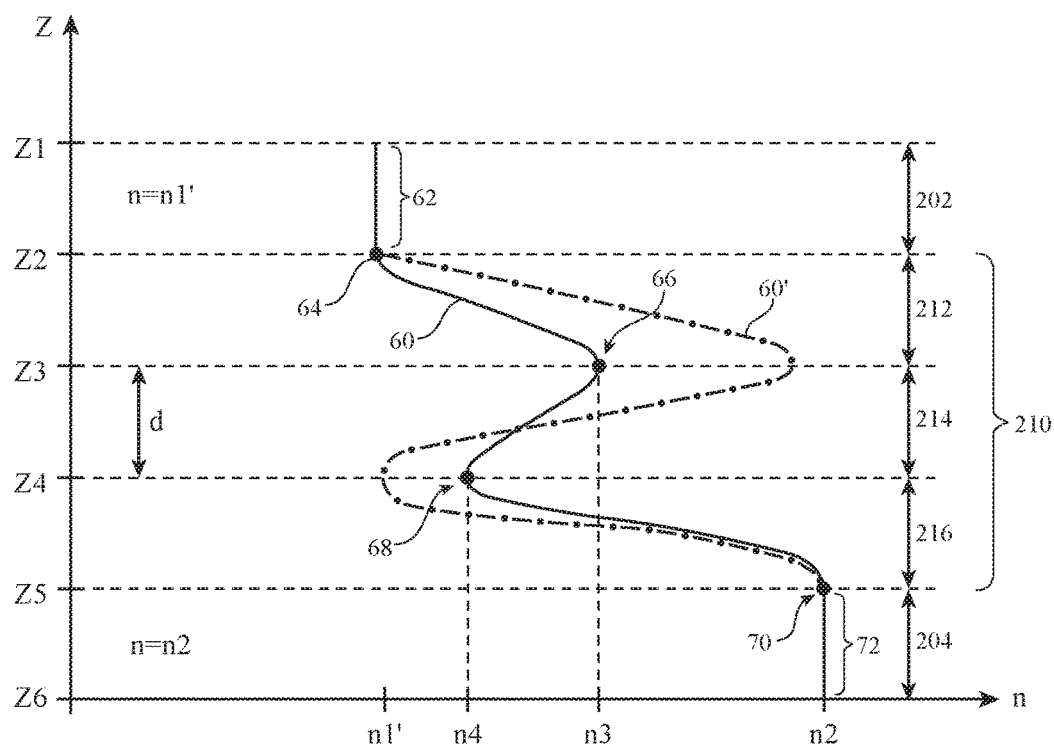
FIG. 9 is a diagram showing how the index of refraction may vary within a matching layer of the type shown in FIG. 8 in accordance with an embodiment.

FIG. 9 is a graph showing how the index of refraction n may vary as a function of vertical position Z through the display layers of FIG. 8. Because cover layer 200 is often considered to be one of the layers in display 14, outer layer 200 may also be referred to as a display layer.

Matching layer 210 may have a continuously graded profile as illustrated by continuously varying index of refraction profile 60 or may have a stepwise varying index of refraction profile. There may be any suitable number of discrete steps in a stepped index of refraction profile (e.g., two or more, three or more, four or more, five or more, six or more, ten or more, twenty or more, etc.). Continuous profile 60 and/or a stepped profile may by formed using deposition techniques such as sputtering. The total thickness of layer 210 may be, for example, 200 nm (e.g. 10 nm to 1 micron, etc.).

Display layer 202 (e.g., a glass or other transparent layer) may have an upper surface at position Z1 and a lower surface at position Z2. Between Z1 and Z2, layer 202 has an index of refraction of n1', as illustrated by index of refraction profile segment 62. At point 64, the index of refraction of matching layer 210 is exactly or approximately matched to the index of refraction n1' of layer 202. In a continuously variable graded index configuration, for example, the index of refraction of matching layer 210 is preferably close to or equal to n1' at point 64, as shown by line 60. The value of n1' may be 1.5 (e.g., for glass or plastic), 1.6, 1.7 (e.g., for sapphire), less than 1.75, 1.6 to 1.8, less than 1.7, less than 1.6, 1.4 to 1.6, less than 1.8, etc.

Sublayer 212 may have an upper surface at position Z2 and a lower surface at position Z3. Between heights Z2 and Z3, the index of refraction in sublayer 212 preferably increases monotonically (i.e., the index of refraction is ever increasing from point 64 to point 66). At point 66, the index of refraction may be equal to n3. Index n3 may be equal to 1.7 (as an example).

Sublayer 214 may have an upper surface at position Z3 and a lower surface at position Z4. Between heights Z3 and Z4, the index of refraction in sublayer 214 preferably decreases monotonically (i.e., the index of refraction is ever decreasing from point 66 to point 68). At point 68, the index of refraction may be equal to n4. Index n4 may be equal to 1.6 (as an example).

Sublayer 216 may have an upper surface at position Z4 and a lower surface at position Z5. Between heights Z4 and Z5, the index of refraction in sublayer 216 preferably increases monotonically (i.e., the index of refraction is ever increasing from point 68 to point 70). At point 70, the index of refraction of sublayer 216 is exactly or approximately matched to the index of refraction n2 of adjoining layer 204. Display layer 204 (e.g., a silicon nitride layer, indium tin oxide layer, or other display layers with a relatively elevated refractive index compared to silicon oxide) may have an upper surface at position Z5 and a lower surface at position Z6. Between Z5 and Z6, layer 204 has a fixed index of refraction of n2, as illustrated by index of refraction profile segment 72.

Continuously varying profile 60 of FIG. 9 is merely illustrative and does not serve to limit the scope of the present invention. In other suitable arrangements, matching layer 210 may have a profile such as profile 60'. As illustrated by profile 60', the index of refraction of sublayer 212 may increase from n1' to n2 between heights Z2 and Z3; the index of refraction of sublayer 214 may decrease from n2 back down to n1' between heights Z3 and Z4; and the index of refraction of sublayer 216 may increase from n1' back up to n2 between heights Z4 and Z5. In general, the graded profile of matching layer 210 can vary up and down to between any desired levels of index of refraction (i.e., n3 and n4 can be any suitable value, where n3 is greater than n1' and n4), as long as the profile is substantially matched to n1' at point 64 and to n2 at point 70.

With the arrangement of FIG. 9, index of refraction discontinuities, which can lead to undesired reflections and visible artifacts, are minimized. For example, index mismatch between layer 202 and layer 210 is minimized by reducing mismatch at position Z2 (point 64). The smooth gradually varying index values between points 64 and 70 avoid abrupt large index of refraction discontinuities and thereby avoid reflections. Index mismatch between layer 210 and layer 204 is minimized by reducing mismatch at position Z5 (point 70).

Referring back to FIG. 8, matching layer 210 includes an additional reverse matching layer 214 in comparison to matching layer 103 of FIG. 7. The insertion of this reverse matching layer between sublayers 212 and 216 may be advantageous since it can be used to help induce a desired amount of optical path displacement 4 for light traveling through reverse matching sublayer 214. As shown in the example of FIG. 8, incoming light 250 traversing through layer 214 may be deflected by an amount Δ (see portion 250'), while the corresponding reflected light 260 may again be deflected by amount Δ (see portion 260') when traversing through 214 for the second time. The total effective optical path difference may therefore be equal to 2Δ, which can be tuned to result in a destructive optical interference between the incoming light and the reflected light to further reduce the reflectance at one or more wavelengths.

Figure 10:
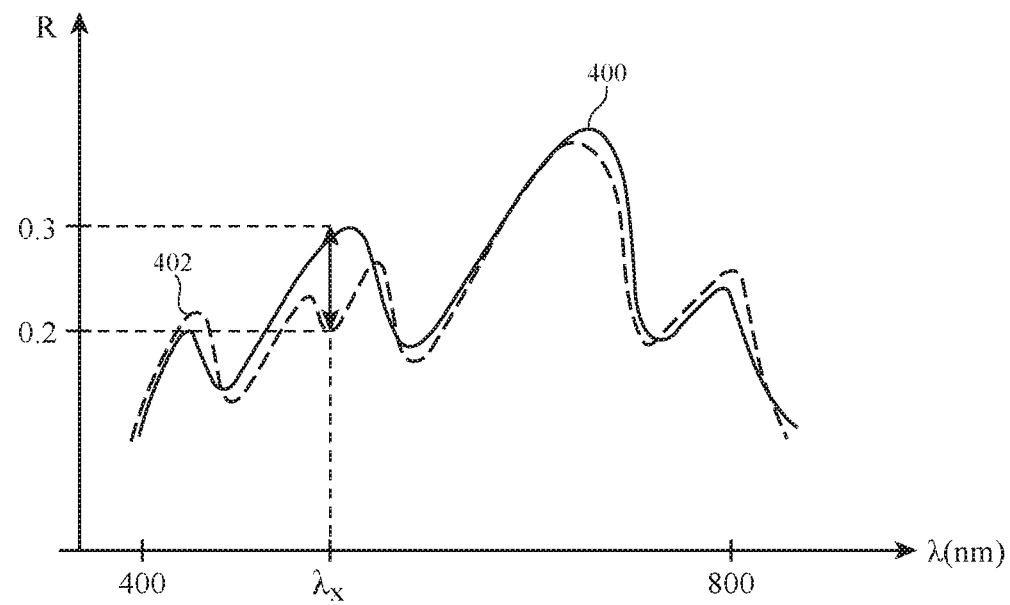
FIG. 10 is a plot of reflection versus wavelength showing how reflections can be suppressed at a selected wavelength in accordance with an embodiment.

FIG. 10 is a plot of reflection versus wavelength showing how reflections can be suppressed at a selected wavelength in accordance with an embodiment. Curve 400 represents the amount of reflectance provided by a display without a reverse matching layer, whereas curve 402 represents the amount of reflectance provided by a display that includes a reverse matching layer. As shown in FIG. 10, curve 402 offers a noticeable amount of reflectance suppression at wavelength $\lambda_X$ relative to curve 400. The general use of a graded index matching layer can already substantially reduce the amount of reflection on a display. Implementing an additional reverse matching layer in this way can further minimize reflections at selected wavelength(s) by an additional 10% or more.

Figure 11:
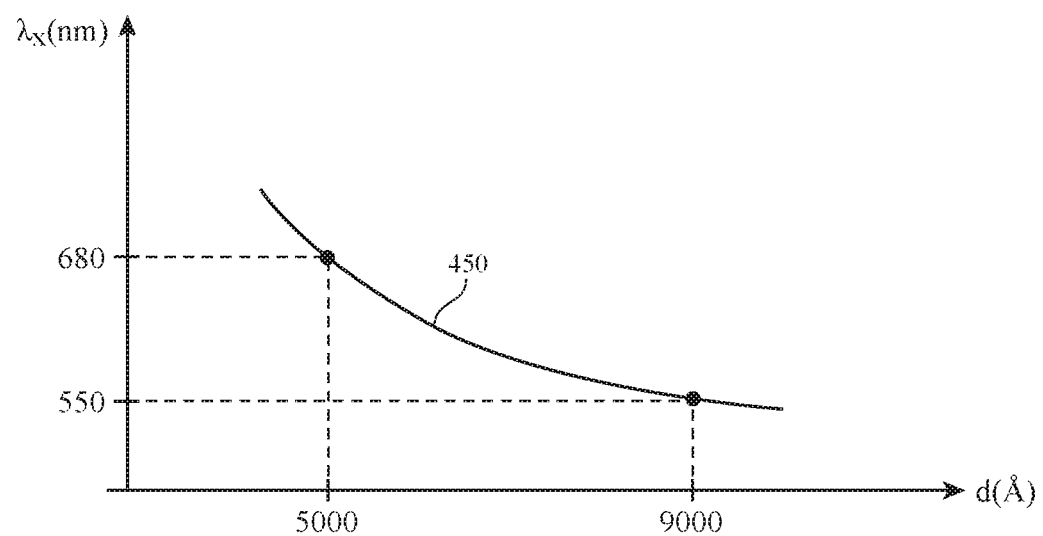
FIG. 11 is a plot showing how the thickness of the reverse matching layer of FIG. 8 can be varied to adjust the selective reflection suppression wavelength in accordance with an embodiment.

As shown in both FIGS. 8 and 9, the reverse matching layer 214 may have a thickness d. In accordance with another embodiment, thickness d of sublayer 214 may be tuned to adjust the wavelength at which the destructive interference is provided. FIG. 11 is a plot showing how thickness d of sublayer 214 can be varied to adjust the wavelength $\lambda_X$ at which the enhanced reflection suppression is centered. As shown by curve 450 of FIG. 11, wavelength $\lambda_X$ may decrease as thickness d is increased. For example, a 5000 Å (angstrom) reverse matching sublayer may yield additional reflectance suppression at 680 nanometers (nm), whereas a 9000 Å reverse matching sublayer may yield additional reflectance suppression at 550 nm. If it is desired to center $\lambda_X$ at some wavelength between 550 and 680, a corresponding point on curve 450 may be selected. This example is merely illustrative. In other arrangements, thickness d may be decreased to lower wavelength $\lambda_X$.

Figure 12:
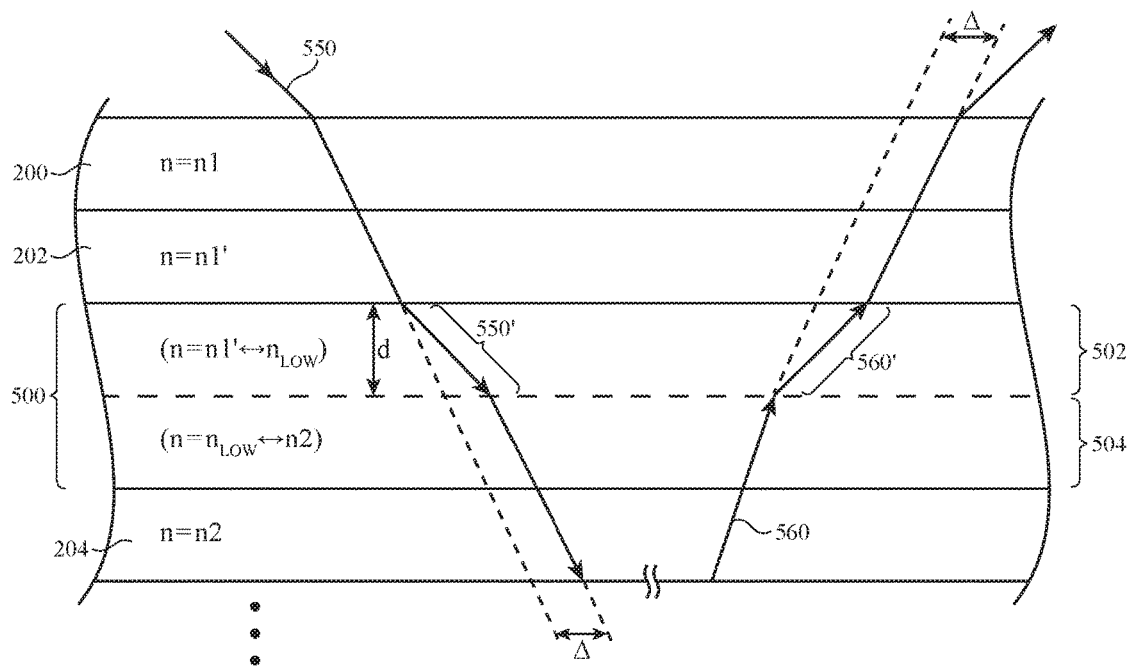
FIG. 12 is a cross-sectional side view of illustrative display layers having a reverse matching layer in accordance with another embodiment.

The configuration of FIG. 8 in which matching layer 210 includes three sublayers is merely illustrative. FIG. 12 shows another suitable arrangement in which a matching layer such as matching layer 500 includes only two sublayers, one of which is serves as a reverse matching layer. As shown in FIG. 12, matching layer 500 may include a first matching sublayer 502 and a second matching sublayer 504. Sublayer 502 may be a graded index layer having an index of refraction of n1' at its top surface to match with that of adjoining display layer 202 and an index of refraction of $n_{LOW}$ at its bottom surface (in the orientation of FIG. 12), where $n_{LOW}$ is less than n1' (i.e., the refractive index decreases with depth). Sublayer 502 configured in this way may therefore serve as a reverse matching layer. Reverse matching sublayer 502 may have a thickness d that can also be tuned to adjust the wavelength at which additional reflectance suppression is provided, as discussed in connection with FIG. 11.

Sublayer 504 may be a graded index layer having an index of refraction of $n_{LOW}$ at its top surface and an index of refraction of n2 at its bottom surface to match with that of adjoining display layer 204, where n2 is greater than $n_{LOW}$. Formed in this way, matching layer 500 has a refractive index profile that helps minimize reflections at the interface between the upper surface of sublayer 502 and layer 202 and at the interface between the bottom surface of sublayer 504 and layer 204.

Figure 13:
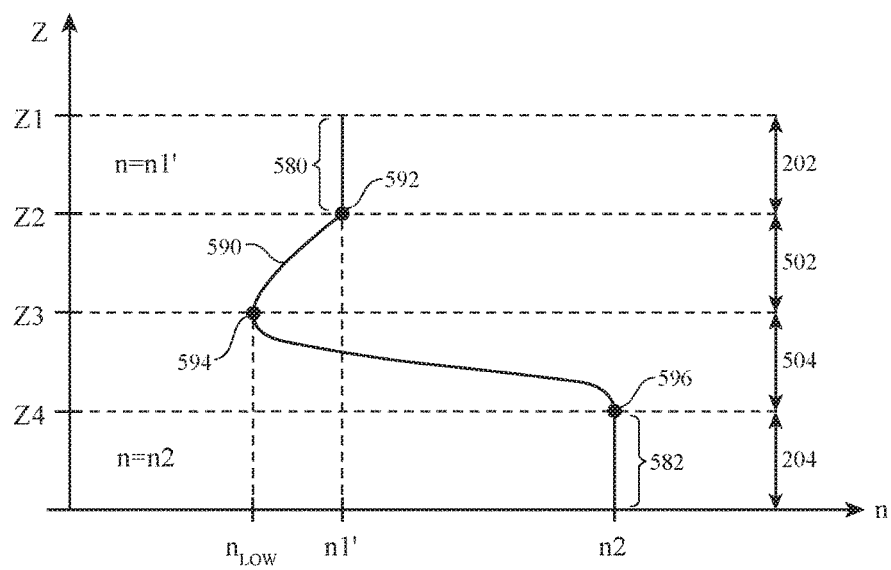
FIG. 13 is a diagram showing how the index of refraction may vary within a matching layer of the type shown in FIG. 12 in accordance with an embodiment.

FIG. 13 is a graph showing how the index of refraction n may vary as a function of vertical position Z through the display layers of FIG. 12. Matching layer 500 may have a continuously graded profile as illustrated by continuously varying index of refraction profile 590 or may have a stepwise varying index of refraction profile. There may be any suitable number of discrete steps in a stepped index of refraction profile (e.g., two or more, three or more, four or more, five or more, six or more, ten or more, twenty or more, etc.). Continuous profile 590 and/or a stepped profile may by formed using deposition techniques such as sputtering. The total thickness of layer 500 may be, for example, 100 nm (e.g. 10 nm to 1 micron, etc.).

Display layer 202 (e.g., a glass or other transparent layer) may have an upper surface at position Z1 and a lower surface at position Z2. Between Z1 and Z2, layer 202 has an index of refraction of n1', as illustrated by index of refraction profile segment 580. At point 592, the index of refraction of matching layer 500 is exactly or approximately matched to the index of refraction n1' of layer 202. In a continuously variable graded index configuration, for example, the index of refraction of matching layer 500 is preferably close to or equal to n1' at point 590, as shown by line 590.

Sublayer 502 may have an upper surface at position Z2 and a lower surface at position Z3. Between heights Z2 and Z3, the index of refraction in sublayer 502 preferably decreases monotonically (i.e., the index of refraction is ever decreasing from point 592 to point 594). At point 594, the index of refraction may be equal to $n_{LOW}$. Index $n_{LOW}$ may be equal to 1.3 (as an example).

Sublayer 504 may have an upper surface at position Z3 and a lower surface at position Z4. Between heights Z3 and Z4, the index of refraction in sublayer 214 preferably increases monotonically (i.e., the index of refraction is ever increasing from point 594 to point 596). At point 596, the index of refraction may be exactly or approximately matched to the index of refraction n2 of adjoining layer 204. Between Z5 and Z6, layer 204 has a fixed index of refraction of n2, as illustrated by index of refraction profile segment 582.

Continuously varying profile 590 of FIG. 13 is merely illustrative and does not serve to limit the scope of the present invention. In general, the matching layer interposed between layers 202 and 204 may include any number of sublayers having one or more reverse matching layers, as long as the profile is substantially matched to n1' at point 592 and to n2 at point 596. In other words, some matching layers can include two or more non-adjacent reverse matching sublayers, three or more non-adjacent reverse matching sublayers, etc. With the arrangement of FIG. 12, index of refraction discontinuities, which can lead to undesired reflections and visible artifacts, are minimized. The smooth gradually varying index values between points 592 and 596 avoid abrupt large index of refraction discontinuities and thereby avoid reflections.

Figure 14:
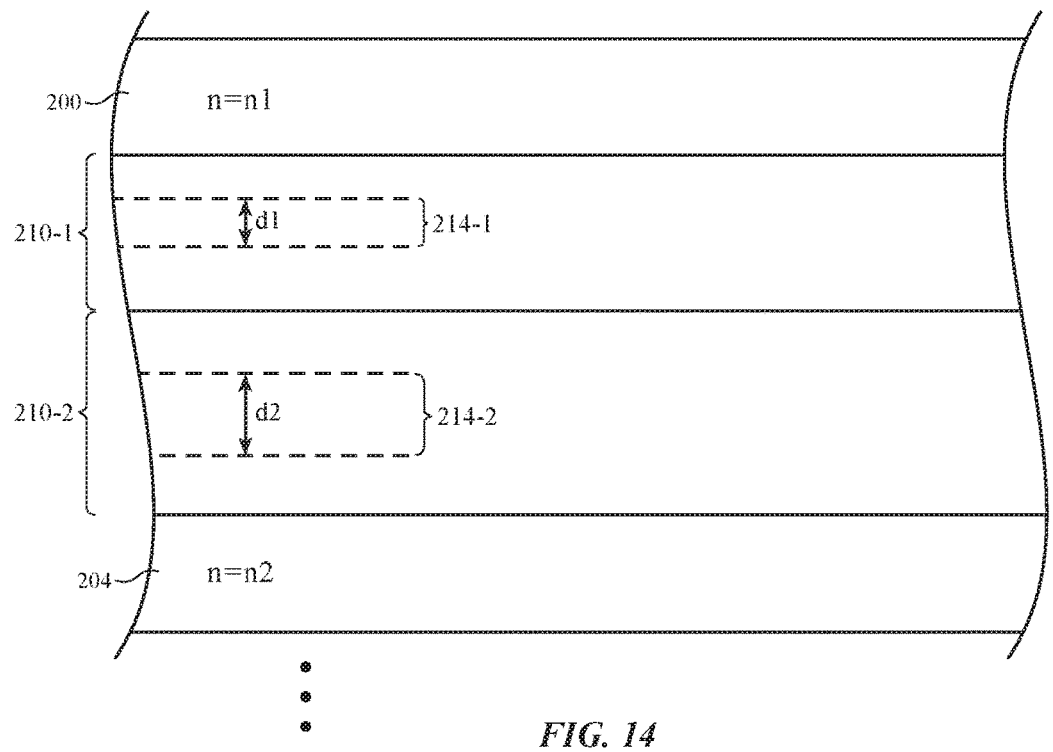
FIG. 14 is a diagram showing how multiple matching layers may be stacked to provide reflection suppression at more than one wavelength in accordance with another embodiment.

In accordance with another suitable arrangement, multiple matching layers may be formed between display layers 200 and 204. Display layer 202 need not be formed. FIG. 14 is a diagram showing how multiple matching layers may be stacked to provide reflection suppression at more than one wavelength. As shown in FIG. 14, a first matching layer 210-1 that includes its own reverse matching sublayer 214-1 may be formed under layer 200, whereas a second matching layer 210-2 that includes its own reverse matching sublayer 214-2 may be formed between layers 210-1 and 204. Matching layers 210-1 and 210-2 may be implemented using the three-layer configuration of FIG. 8, using the two-layer configuration of FIG. 12, or using any number of sublayers having at least one reverse matching sublayer.

The reverse matching sublayer 214-1 of matching layer 210-1 may have a thickness d1, whereas the reverse matching sublayer 214-2 of matching layer 210-2 may have a thickness d2. Thickness d2 may generally be different than thickness d1. If desired, thickness d1 may be set equal to thickness d2. Superimposed in this way, thickness d1 of reverse matching layer 214-1 may be selected to provide enhance reflection reduction at a first visible wavelength while thickness d2 of reverse matching layer 214-2 may be selected to provide enhanced reflection reduction at a second visible wavelength that is different than the first visible wavelength.

Figure 15:
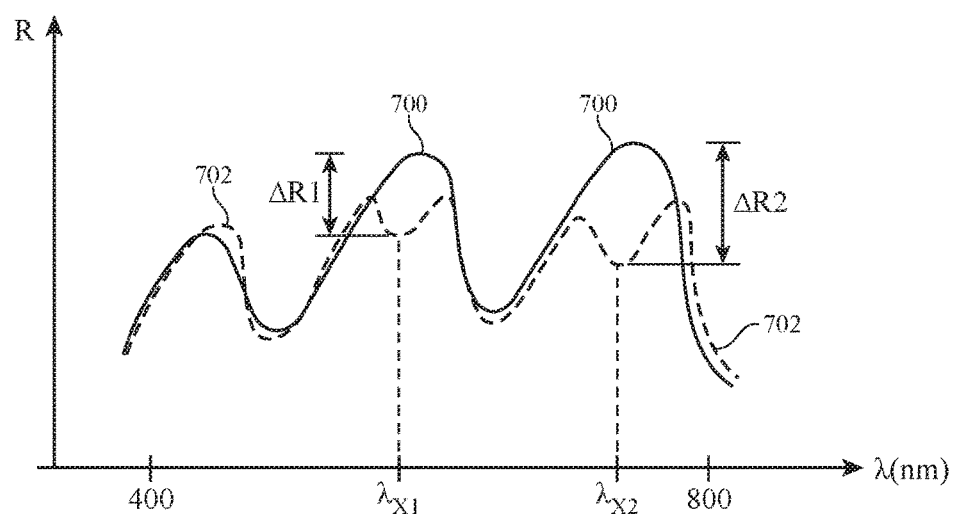
FIG. 15 is a plot of reflection versus wavelength showing how reflections can be suppressed at multiple different wavelengths in accordance with an embodiment.

FIG. 15 is a graph in which the amount of reflection from a display has been plotted as a function of wavelength. The graph of FIG. 15 covers visible light wavelengths ranging from 390 nm to 800 nm. Line 700 corresponds to reflection from a display that includes a matching layer of FIG. 7. Line 702 illustrates the result when display 14 is provided with multiple matching layers in the way shown in FIG. 14. As shown by line 702, this type of arrangement can result in additional reflection reduction of $\Delta R1$ at wavelength $\lambda_{X1}$ (which is set by thickness d1) and of $\Delta R2$ at wavelength $\lambda_{X2}$ (which is set by thickness d2). In general, any number of matching layers can be stacked in this way to help reduce reflections at any desired number of wavelengths.

The foregoing is merely illustrative and various modifications can be made by those skilled in the art without departing from the scope and spirit of the described embodiments. The foregoing embodiments may be implemented individually or in any combination.

What is claimed is:

1. Display circuitry, comprising:
   a first display layer having a first index of refraction that is substantially fixed;
   a second display layer having a second index of refraction that is substantially fixed, wherein the second index of refraction is different than the first index of refraction; and
   a matching layer interposed between the first and second display layers, wherein the matching layer has a first sublayer having a graded index of refraction that monotonically increases from the first display layer to the second display layer and a second sublayer having a graded index of refraction that monotonically decreases from the first display layer to the second display layer, wherein the first sublayer contacts the second sublayer.

2. The display circuitry defined in claim 1, wherein the matching layer further includes a third sublayer having a graded index of refraction that monotonically increases from the first display layer to the second display layer.

3. The display circuitry defined in claim 2, wherein the second sublayer of the matching layer is interposed between the first and third sublayers of the matching layer.

4. The display circuitry defined in claim 1, wherein the second sublayer of the matching layer has a thickness that determines what wavelength additional reflection suppression is provided.

5. The display circuitry defined in claim 1, wherein the first sublayer of the matching layer has a first surface with an index of refraction that matches with the first index of refraction.

6. The display circuitry defined in claim 5, wherein the first sublayer of the matching layer has a second surface with another index of refraction, and wherein the second sublayer of the matching layer has a surface with an index of refraction that matches the another index of refraction.

7. The display circuitry defined in claim 1, further comprising:
   an additional matching layer interposed between the first and the second display layers.

8. The display circuitry defined in claim 7, wherein the additional matching layer comprises:
   a first sublayer having a graded index of refraction that monotonically increases from the first display layer to the second display layer; and
   a second sublayer having a graded index of refraction that monotonically decreases from the first display layer to the second display layer.

9. The display circuitry defined in claim 1, wherein the first index of refraction is less than the second index of refraction.

10. The display circuitry defined in claim 1, wherein incoming light traverses the first display layer before traversing the second display layer.

11. An electronic device, comprising:
    a housing; and
    a display in the housing, wherein the display comprises:
       a first layer having a substantially fixed refractive index;
       a second layer having a substantially fixed refractive index; and
       a matching layer that is interposed between the first and second layers and that includes a first sublayer having gradually increasing refractive indices and a second sublayer having gradually decreasing refractive indices, wherein the first sublayer is in direct contact with the second sublayer.

12. The electronic device defined in claim 11, wherein the matching layer of display further comprises:
    a third sublayer having gradually increasing refractive indices.

13. The electronic device defined in claim 12, wherein the second sublayer is interposed between the first and third sublayers.

14. The electronic device defined in claim 13, wherein first sublayer is in direct contact with the first layer, and wherein the third sublayer is in direct contact with the second layer.

15. The electronic device defined in claim 11, wherein first sublayer is in direct contact with the first layer, and wherein the second sublayer is in direct contact with the second layer.

16. Apparatus, comprising:
    a first layer having a first index of refraction that is substantially fixed;
    a second layer having a second index of refraction that is substantially fixed; and
    a graded index of refraction matching layer interposed between the first and second layers, wherein the graded index of refraction matching layer includes an embedded reverse matching sublayer, wherein the graded index of refraction matching layer includes a sublayer having an index of refraction that monotonically increases in a given orientation, and wherein the sublayer is directly on the embedded reverse matching sublayer.

17. The apparatus defined in claim 16, wherein the first index of refraction is different than the second index of refraction.

18. The apparatus defined in claim 16, wherein the embedded reverse matching sublayer has an index of refraction that monotonically decreases in the given orientation.

19. The apparatus defined in claim 16, further comprising:
   an additional graded index of refraction matching layer that is interposed between the first and second layers, wherein the additional graded index of refraction matching layer also includes an embedded reverse matching sublayer.

20. The apparatus defined in claim 19, wherein the embedded reverse matching sublayer in the graded index of refraction matching layer has a first thickness, and wherein the embedded reverse matching sublayer in the additional graded index of refraction matching layer has a second thickness that is different than the first thickness.

\* \* \* \* \*